(12) United States Patent
Choi et al.

(10) Patent No.: US 9,906,170 B2
(45) Date of Patent: Feb. 27, 2018

(54) TRIBOELECTRIC ENERGY HARVESTER INCLUDING COATING ELECTRIFICATION LAYER AND MANUFACTURING METHOD THEREOF

(71) Applicant: KOREA ADVANCED INSTITUTE OF SCIENCE AND TECHNOLOGY, Daejeon (KR)

(72) Inventors: Yang Kyu Choi, Daejeon (KR); Myeong Lok Seol, Daejeon (KR); Dong Il Lee, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 342 days.

(21) Appl. No.: 14/860,996

(22) Filed: Sep. 22, 2015

(65) Prior Publication Data

US 2016/0149517 A1    May 26, 2016

(30) Foreign Application Priority Data

Sep. 23, 2014  (KR) .................. 10-2014-0126810

(51) Int. Cl.
    *H02N 1/04*    (2006.01)
(52) U.S. Cl.
    CPC .................... *H02N 1/04* (2013.01)

(58) Field of Classification Search
    CPC ........................................ H02N 1/04
    USPC ........................................ 310/309
    See application file for complete search history.

(56) References Cited

U.S. PATENT DOCUMENTS

| | | | | |
|---|---|---|---|---|
| 7,732,974 | B1 * | 6/2010 | Boland | H02N 1/08 310/309 |
| 8,519,677 | B2 * | 8/2013 | Post | H02N 1/04 320/128 |
| 9,790,928 | B2 * | 10/2017 | Wang | F03G 5/06 |
| 2013/0049531 | A1 * | 2/2013 | Wang | H02N 1/04 310/309 |
| 2014/0338458 | A1 * | 11/2014 | Wang | G01L 1/005 73/658 |
| 2016/0149518 | A1 * | 5/2016 | Wang | H02N 1/04 310/310 |
| 2016/0218640 | A1 * | 7/2016 | Wang | H02N 1/04 |
| 2017/0187306 | A1 * | 6/2017 | Yeo | H02N 1/04 |

* cited by examiner

*Primary Examiner* — Jeremy Luks
(74) *Attorney, Agent, or Firm* — Blank Rome LLP

(57) ABSTRACT

A manufacturing method of a triboelectric energy harvester, including the steps of generating an electrification material with a surface of a micro-nano pattern on an electrode and forming a coating electrification layer to support the micro-nano pattern on a surface of the electrification material, is provided.

10 Claims, 7 Drawing Sheets

410

420

_US 9,906,170 B2_

TRIBOELECTRIC ENERGY HARVESTER INCLUDING COATING ELECTRIFICATION LAYER AND MANUFACTURING METHOD THEREOF

CROSS-REFERENCE TO RELATED APPLICATION(S)

This application claims the benefit under 35 U.S.C. § 119(a) of a Korean patent application filed on Sep. 23, 2014 in the Korean Intellectual Property Office and assigned Serial number 10-2014-0126810, the entire disclosure of which is hereby incorporated by reference.

TECHNICAL FIELD

The present disclosure relates to technology for a triboelectric energy harvester including a coating electrification layer and a manufacturing method thereof, and more particularly, to a triboelectric energy harvester including a coating electrification layer formed on the surface of a micro-nano pattern of an electrification material and a manufacturing method.

BACKGROUND

A triboelectric energy harvester includes two different electrification materials and generates an inductive current by using surface charges (static electricity) electrified to electrically positive or negative polarity on respective surfaces when the two different electrification materials physically contact with each other. For that reason, such a triboelectric energy harvester is used for energy harvesting as the technology of converting energy, which is wasted without reuse in the circumstances, into electric energy which can be highly usable.

Especially, in recent years, studies about micro-nano patterned contact interface are progressing to extend triboelectric areas helpful for higher output voltages. Since an electrification material employed in a triboelectric energy harvester is formed to have a micro-nano patterned surface only through a soft lithography or bottom-up process, there is a limit to a kind of material which must be adaptable to such a process.

In this regard, technology of improving the triboelectric characteristics of a contact interface needs to be provided for extending a surface area of the contact interface by forming a coating electrification layer on the surface of an electrification layer to maintain a micro-nano pattern.

SUMMARY

Aspects of the present disclosure are to address at least the above-mentioned problems and/or disadvantages and to provide at least the advantages described below. Accordingly, an aspect of the present disclosure is to provide a triboelectric energy harvester improving the triboelectric characteristics of a contact interface for extending a surface area of the contact interface by forming a coating electrification layer on the surface of an electrification layer to maintain a micro-nano pattern, and a manufacturing method thereof Especially, embodiments of the present disclosure are to provide a triboelectric energy harvester improving the triboelectric characteristics of a contact interface by forming a coating electrification layer which is made of a material higher than an electrification material in triboelectric charge density, and a manufacturing method thereof.

In accordance with an aspect of the present disclosure, a manufacturing method of a triboelectric energy harvester may include the steps of generating an electrification material with a surface of a micro-nano pattern on an electrode, and forming a coating electrification layer to support the micro-nano pattern on a surface of the electrification material.

The step of forming the coating electrification layer may include the step of forming the coating electrification layer on the surface of the electrification material by using at least one of ICVD or SAM.

The step of forming the coating electrification layer may include the step of forming the coating electrification layer with a material that is higher than the electrification material in triboelectric charge density.

The step of forming the coating electrification layer may include the step of forming the coating electrification layer with at least one of polymer, organic material, or dielectric material superior in step coverage to support the micro-nano pattern.

The step of forming the coating electrification layer may include the step of forming the coating electrification layer to have a plurality of layers on the surface of the electrification material.

In accordance with another aspect of the present disclosure, a triboelectric energy harvester having a coating electrification layer may include an electrode, an electrification material generated on the electrode and configured to have a surface of a micro-nano pattern, and a coating electrification layer formed on the surface of the electrification material.

The coating electrification layer may be formed on the surface of the electrification material by using at least one of ICVD or SAM.

The coating electrification layer may be formed with a material that is higher than the electrification material in triboelectric charge density.

The coating electrification layer may be formed with at least one of polymer, organic material, or dielectric material superior in step coverage to support the micro-nano pattern.

The coating electrification layer may be formed to have a plurality of layers on the surface of the electrification material.

According to embodiments of the present disclosure, it may be allowable to provide a triboelectric energy harvester improving the triboelectric characteristics of a contact interface for extending a surface area of the contact interface by forming a coating electrification layer on the surface of an electrification layer to maintain a micro-nano pattern, and to provide a manufacturing method thereof.

Especially, it may be accomplishable to provide a triboelectric energy harvester improving the triboelectric characteristics of a contact interface by forming a coating electrification layer which is made of a material higher than an electrification material in triboelectric charge density, and to provide a manufacturing method thereof.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
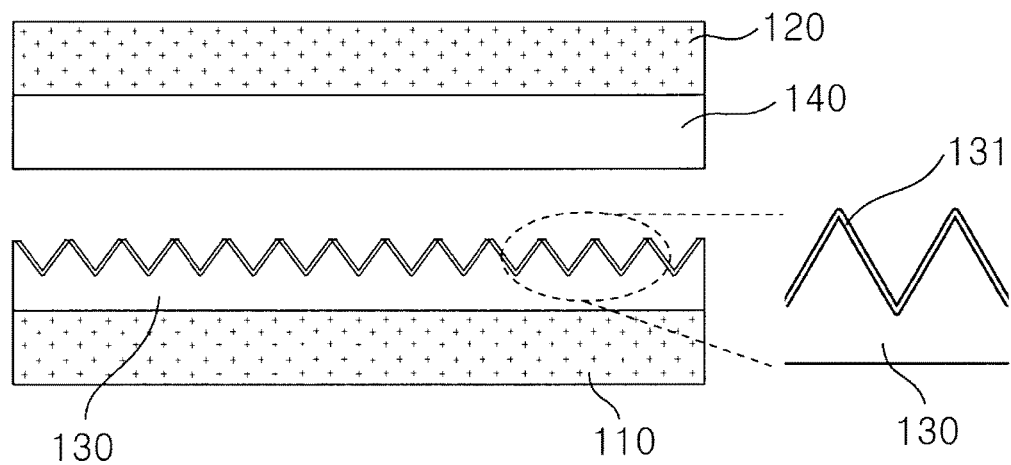
FIGS. 1A and 1B are diagrams illustrating triboelectric energy harvesters including coating electrification layers according to embodiments of the present disclosure.

Hereinafter, embodiments of the present disclosure will be described in conjunction with the accompanying drawings. Various embodiments described herein, however, may not be intentionally confined in specific embodiments, but should be construed as including diverse modifications, equivalents, and/or alternatives. With respect to the descriptions of the drawings, like reference numerals refer to like elements.

Figure 1B:
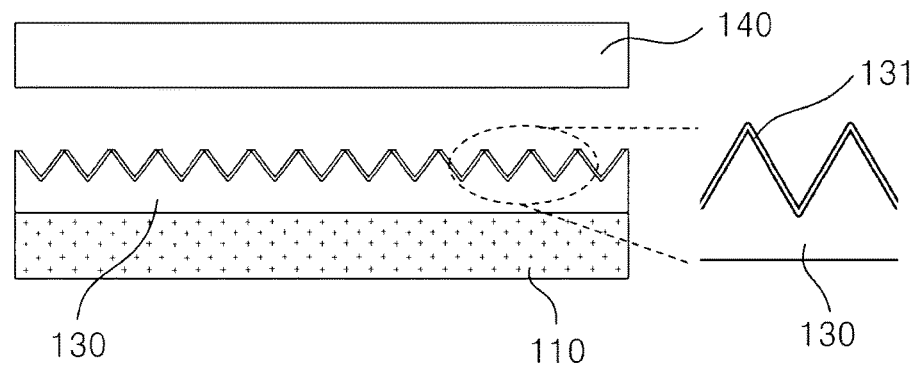

FIGS. 1A and 1B are diagrams illustrating triboelectric energy harvesters including coating electrification layers according to embodiments of the present disclosure.

Referring to FIG. 1A, a triboelectric energy harvester according to an embodiment of the present disclosure may includes a lower electrode 110, an upper electrode 120, a lower electrification material 130 generated on the lower electrode 110, and an upper electrification material 140 formed under the upper electrode 120. In this configuration, the lower electrification material 130 may be formed of at least one of polymer, organic material, or dielectric material to have a micro-nano patterned surface by using a soft lithography or bottom-up process. For example, a micro-nano pattern of natural reproduction structure may be formed on the surface of the lower electrification material 130. This mechanism will be detailed later with reference to FIG. 5.

A triboelectric energy harvester may include a coating electrification layer 131 which is formed to support a micro-nano pattern on the surface of the lower electrification material 130. For example, the coating electrification layer 131 may support its micro-nano pattern with the surface of the lower electrification material 130, as it stands, by uniformly depositing at least one of polymer, organic material, or dielectric material, which is superior in step coverage, by atomic level (e.g., by gaseous state) on the surface of the lower electrification material 130. For example in further detail, the coating electrification layer 131 may be formed on the surface of the lower electrification material 130 by using at least one of Initiated Chemical Vapor Deposition (ICVD) or Self Assembly Monolayer (SAM). This will be detailed later with reference to FIG. 3.

During this, the coating electrification layer 131 may be formed of a material which is higher than the lower electrification material 130 in triboelectric charge density (e.g., the coating electrification layer 131 may be formed of at least one of polymer, organic material, or dielectric material, which is higher in triboelectric charge density than the lower electrification material 130 formed of at least one of polymer, organic material, or dielectric material). This condition that a material forming the coating electrification layer 131 is higher than the lower electrification material 130 in triboelectric charge density may mean that the material forming the coating electrification layer 131 is superior to the lower electrification material 130 in property of losing or absorbing charges.

Therefore, a triboelectric energy harvester according to an embodiment of the present disclosure may be improved in triboelectric characteristics of a contact interface, extending a surface area of the contact interface, by including supporting a macro-nano pattern and including the coating electrification layer 131 with a high triboelectric charge density.

Additionally, the coating electrification layer 131 may be formed to have a plurality of layers. In this case, a plurality of layers of the coating electrification layer 130 may be formed of different materials, respectively, or formed in different properties. For example, in the case of forming the coating electrification layer 131 with two layers, a first layer formed on the surface of the lower electrification material 130 may be well deposited in a micro-nano pattern and may be formed in a polymer with superior step coverage, and a second layer formed on the first layer may be formed in a polymer with superior triboelectric characteristics. In regard to a triboelectric energy harvester for the case of FIG. 1A, while the coating electrification layer 131 is illustrated as being formed only on the lower electrification material 130, embodiments of the present disclosure may not be restrictive hereto and the coating electrification layer 131 may be even formed at the upper electrification material 140. In this case, a triboelectric energy harvester may include the lower electrode 110, the upper electrode 120, the lower electrification material 130 formed on the lower electrode 110, the upper electrification material 140 formed under the upper electrode 120, and a coating electrification material formed on the surface of the upper electrification material 140 (additionally, the coating electrification layer 131 may be also formed at both the upper electrification material 140 and the lower electrification material 130).

Referring to FIG. 1B, a triboelectric energy harvester may include a lower electrode 110, an upper electrode 120, and a lower electrification material 130 generated on the lower electrode 110. To this end, the lower electrification material 130, as like the case of FIG. 1A, may be formed in at least one of polymer, organic material, or dielectric material, having a micro-nano patterned surface, by using at least one of a soft lithography or bottom-up process.

In this configuration, a triboelectric energy harvester may include a coating electrification layer 131 which is formed of at least one of polymer, organic material, or dielectric material with superior step coverage to support a micro-nano pattern on the surface of the lower electrification material 130. For example, the coating electrification layer 131 may be intactly maintained in a micro-nano pattern of the surface of the lower electrification material 130 by uniform deposition with atomic level (e.g., gaseous state) on the surface of the lower electrification material 130. For example in more detail, the coating electrification layer 131 may be formed by using at least one of ICVD or SAM on the surface of the lower electrification material 130.

During this, the coating electrification layer 131 may be formed of a material which is higher than the lower electrification material 130 in triboelectric charge density (e.g., the coating electrification layer 131 may be formed of at least one of polymer, organic material, or dielectric material, which is higher in triboelectric charge density than the lower electrification material 130 formed of at least one of polymer, organic material, or dielectric material). This condition that a material forming the coating electrification layer 131 is higher than the lower electrification material 130 in triboelectric charge density may mean that the material forming the coating electrification layer 131 is superior to the lower electrification material 130 in property of losing or absorbing charges.

Therefore, a triboelectric energy harvester according to an embodiment of the present disclosure may be improved in triboelectric characteristics of a contact interface, extending a surface area of the contact interface, by including supporting a macro-nano pattern and including the coating electrification layer 131 with a high triboelectric charge density.

Additionally, the coating electrification layer 131 may be formed to have a plurality of layers. In this case, a plurality of layers of the coating electrification layer 130 may be formed of different materials, respectively, or formed in different properties. For example, in the case of forming the coating electrification layer 131 with two layers, a first layer formed on the surface of the lower electrification material 130 may be well deposited in a micro-nano pattern and may be formed in a polymer with superior step coverage, and a second layer formed on the first layer may be formed in a polymer with superior triboelectric characteristics.

In regard to a triboelectric energy harvester for the case of FIG. 1B, while the coating electrification layer 131 is illustrated as being formed only on the lower electrification material 130, embodiments of the present disclosure may not be restrictive hereto and the coating electrification layer 131 may be even formed at the upper electrification material 140. In this case, a triboelectric energy harvester may include the lower electrode 110, the upper electrode 120, the lower electrification material 130 formed on the lower electrode 110, the upper electrification material 140 formed under the upper electrode 120, and a coating electrification material formed on the surface of the upper electrification material.

As such, a triboelectric energy harvester according to an embodiment of the present disclosure may be structured having electrodes 110 and 120, an electrification material 130 generated with a micro-nano patterned surface on the electrodes 110 and 120, and a coating electrification layer 131 formed to support the micro-nano pattern on the surface of the electrification material 130. Therefore, a triboelectric energy harvester according to an embodiment of the present disclosure may be manufactured by a process of generating an electrification material 130 on electrodes 110 and 120, and forming a coating electrification layer 131 to support a micro-nano pattern on the surface of the electrification material 130. This will be described with reference to FIG. 2.

Figure 2:
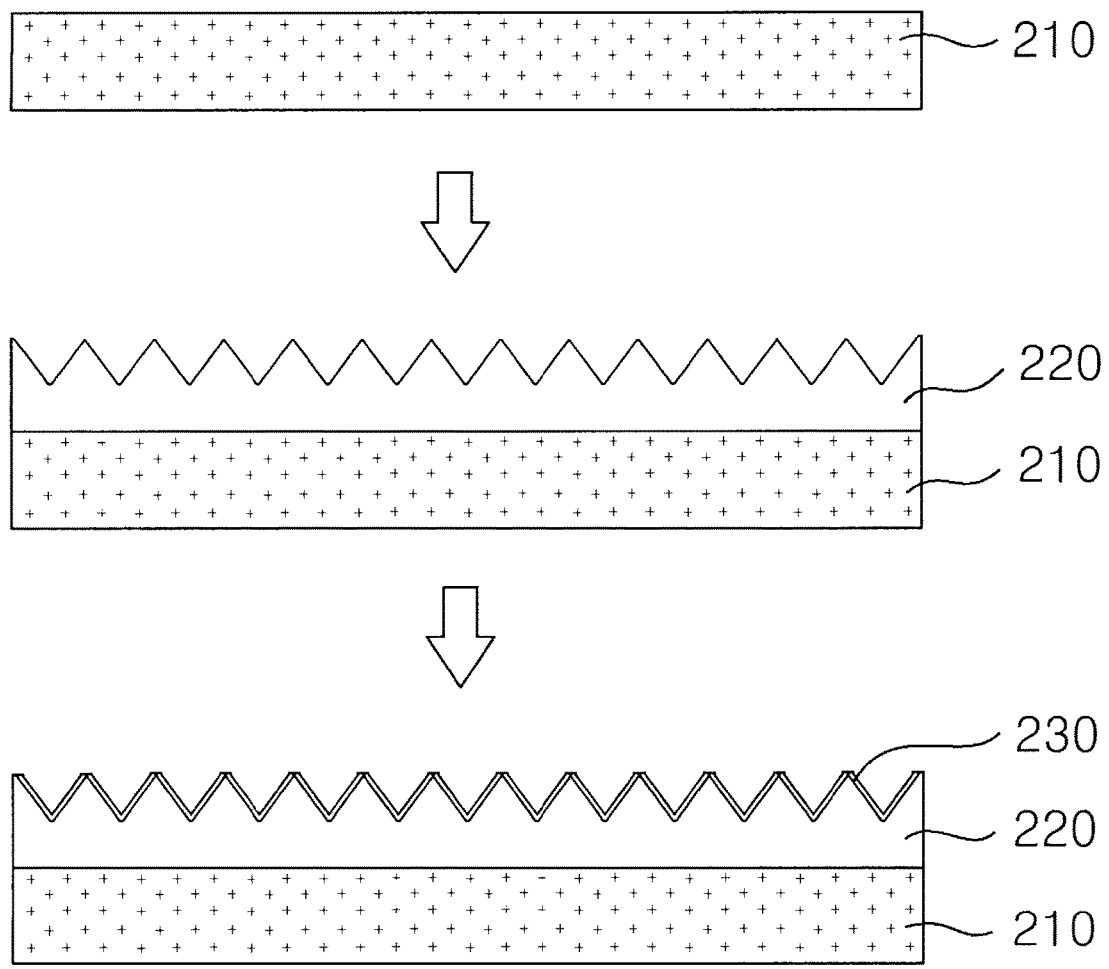
FIG. 2 is a diagram illustrating a process of manufacturing a triboelectric energy harvester including a coating electrification layer according to an embodiment of the present disclosure.

FIG. 2 is a diagram illustrating a process of manufacturing a triboelectric energy harvester including a coating electrification layer according to an embodiment of the present disclosure.

Referring to FIG. 2, a system manufacturing a triboelectric energy harvester according to an embodiment of the present disclosure may form an electrode 210 with a metal (e.g., at least one of Al, Ni, Cu, Au, Ag, or Fe) which highly inclines to bipolar electrification. Although not shown in the drawing, the electrode 210 may be formed on a substrate made of at least one of silicon, polymer, or metal.

Next, a system manufacturing a triboelectric energy harvester may generate an electrification material 220 with a surface of micro-nano pattern on the electrode 210. During this, a system manufacturing a triboelectric energy harvester may generate an electrification material 220 with a surface of micro-nano pattern from at least one of polymer, organic material, or dielectric material by using at least one of a soft lithography or bottom-up process. Here, a micro-nano pattern may mean a shape like micro-nano sized pillars, pyramids, cylinders, or self assembly structure. Additionally, a micro-nano pattern may be formed by using micro-nano sized natural structure (e.g., a structure of lotus leaf, rose petal, or locust wing).

For example, a system manufacturing a triboelectric energy harvester may generate the electrification material by coating at least one of polymer, organic material, or dielectric material in a liquid state on a reproduced mold where a micro-nano pattern is engraved, solidifying at least one of polymer, organic material, or dielectric material, which is coated on the reproduced mold, through one of a thermal process or an optical process, and thereafter separating at least one of the solidified polymer, organic material, or dielectric material and attaching the separated one to the electrode 210.

After then, a system manufacturing a triboelectric energy harvester may form a coating electrification layer 230 to support a micro-nano pattern on the surface of the electrification material 220. During this, a system manufacturing a triboelectric energy harvester may support a micro-nano pattern of the surface of the electrification material 220 by uniformly forming the coating electrification layer 230 with at least one of the polymer, organic material, or dielectric material which is superior in step coverage.

In detail, a system manufacturing a triboelectric energy harvester may intactly support a micro-nano pattern of the surface of the electrification material 220 by depositing at least one of polymer, organic material, or dielectric material, which is higher in triboelectric charge density than at least one of polymer, organic material, or dielectric material forming the electrification material 220, on the surface of the electrification material 220 and forming the coating electrification layer 230 thereon.

For example, a system manufacturing a triboelectric energy harvester may form the coating electrification layer 230 on the surface of the electrification material 220 by using at least one of ICVD or SAM. For example in further detail, in the case that the counter electrode in touch with the coating electrification layer 230 formed on the surface of the electrification material 220 is formed of a metal which highly inclines to lose charges, a system manufacturing a triboelectric energy harvester may form the coating electrification layer 230 with at least one (e.g., electron acceptor) of polymer, organic material, or dielectric material, which strongly absorbs charges and highly inclines to negative electrification, by using at least one of ICVD or SAM to support a micro-nano pattern on the surface of the electrification material 220. Here, at least one of polymer, organic material, or dielectric material forming the coating electrification layer 230 may be higher in property of inclining to negative electrification than at least one of polymer, organic material, or dielectric material forming the electrification material 220.

On the other hand, in the case that the coating electrification layer 230 formed on the surface of the electrification material 220 does not come in direct touch with the counter electrode but in touch with an electrification material formed at the counter electrode, a system manufacturing a triboelectric energy harvester may form the coating electrification layer 230 with at least one (e.g., electron acceptor) of polymer, organic material, or dielectric material, which strongly loses charges and highly inclines to bipolar electrification, by using at least one of ICVD or SAM to support a micro-nano pattern on the surface of the electrification material 220.

Accordingly, since the coating electrification layer 230 is formed to have a higher triboelectric charge density than that of the electrification material 220, while supporting a micro-nano pattern on the surface of the electrification material 220, it may be allowable to extend a surface area of a contact interface and may be accomplishable to improve the triboelectric characteristics of the contact interface.

During this, a system manufacturing a triboelectric energy harvester may form the coating electrification layer 230 with a plurality of layers. In this case, a system manufacturing a triboelectric energy harvester may form the plurality of layers by different materials or different properties, respectively. For example, a system manufacturing a triboelectric energy harvester may form a first layer with a polymer, which has superior step coverage, to help deposition on the electrification material 220 and to support a micro-nano pattern by using ICVD, and may form a second layer with a polymer of superior triboelectric characteristics on the first layer.

Figure 3:
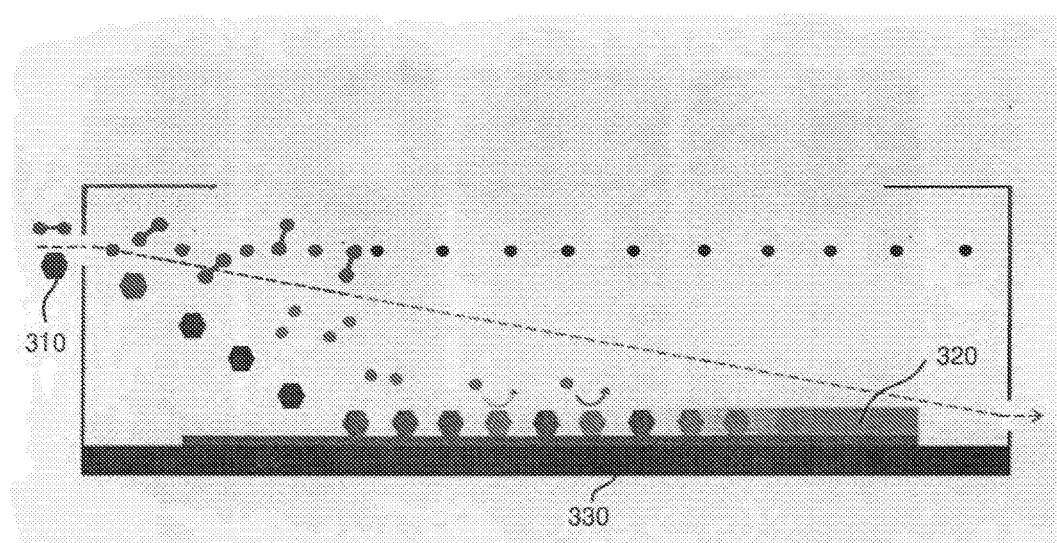
FIG. 3 is a diagram illustrating a feature of forming a coating electrification layer according to an embodiment of the present disclosure.

FIG. 3 is a diagram illustrating a feature of forming a coating electrification layer according to an embodiment of the present disclosure.

Referring to FIG. 3, a coating electrification layer according to an embodiment of the present disclosure may be formed on the surface of an electrification material having a micro-nano pattern by using ICVD.

In detail, precursors (e.g., at least one of polymer, organic material, or dielectric material which has superior step coverage and a high triboelectric charge density) 310 of a coating electrification layer may be injected into a chamber. During this, the inside of the chamber may be retained in specific temperature (e.g., 150~160° C.) by disposing a heater therein.

After then, one of precursor molecules, which are conditioned in the injected monomer, may be formed into a radical, and as a combinable state is set by reacting functional groups of precursors which are conditioned in another monomer, monomer state precursors having combinable functional groups may be coupled each other on the surface of an electrification material and may be converted into a polymer state 320. During this, the surface 330 with a micro-nano pattern of an electrification material may be cooled down to specific temperature (e.g., 10~40° C.) and thereby may be supported its micro-nano pattern.

By repeating such a process on the surface of an electrification material, it may be permissible to uniformly form a coating electrification layer of a plurality of layers to support a micro-nano pattern on the surface of an electrification material.

During this, while a process of forming the aforementioned coating electrification layer can be performed in atomic level, embodiments of the present disclosure may not be restrictive hereto and may be suitably performed under the condition that the coating electrification layer is formed to support a micro-nano pattern on the surface of an electrification material.

Figure 4:
FIG. 4 is a diagram showing the surface of a coating electrification layer according to an embodiment of the present disclosure.
Figure 4:
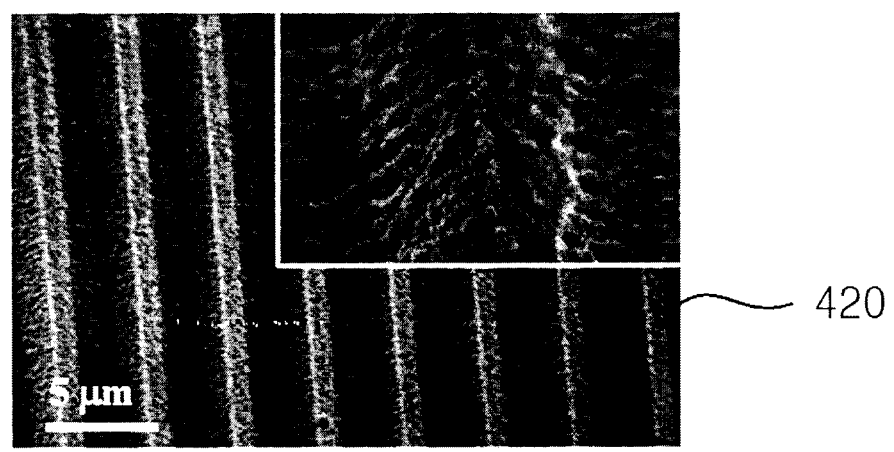

FIG. 4 is a diagram showing the surface of a coating electrification layer according to an embodiment of the present disclosure.

Referring to FIG. 4, the surface 410 of an electrification material before forming a coating electrification layer may be configured in a triangular array structure of micro-nano pattern.

After performing a process of forming the coating electrification layer as described above, the surface 420 of the coating electrification layer may be shown as intactly having a triangle array structure of micro-nano pattern as same as the surface 410 of the electrification material. Additionally, since a coating electrification layer is formed of a material which is higher than an electrification material in triboelectric charge density, a coating electrification layer according to an embodiment of the present disclosure may improve the triboelectric characteristics of a contact interface as well as extending a surface area of the contact interface.

Figure 5:
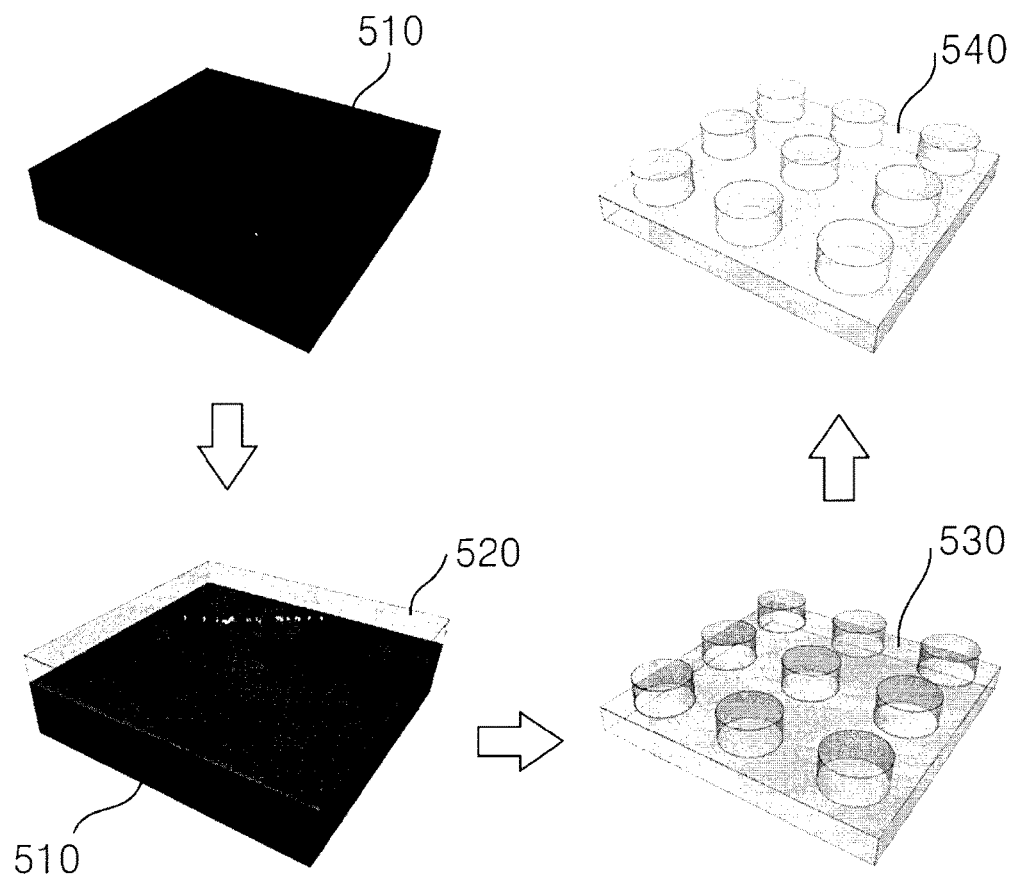
FIG. 5 is a diagram illustrating a process of generating a micro-nano pattern according to an embodiment of the present disclosure.

FIG. 5 is a diagram illustrating a process of generating a micro-nano pattern according to an embodiment of the present disclosure.

Referring to FIG. 5, a system manufacturing a triboelectric energy harvester according to an embodiment of the present disclosure may generate an electrification material to have a micro-nano patterned surface by using a soft lithography process.

In detail, a system manufacturing a triboelectric energy harvester may form an electrification material with a micro-nano patterned surface by liquidly coating at least one 520 of polymer, organic material, or dielectric material on a reproduced mold 510 where a micro-nano pattern is engraved, solidifying at least one of polymer, organic material, or dielectric material which is coated on the reproduced mold 510 through at least one of thermal process or optical process, and thereafter separating at least one 530 of the solidified polymer, organic material, or dielectric material. Here, a system manufacturing a triboelectric energy harvester may use a naturally reproduced structure such as lotus leaf, rose petal, or locust wing for a micro-nano pattern.

During this, to the surface which is formed by liquidly coating the at least one 520 of polymer, organic material, or dielectric material on the reproduced mold 510, a process of preventing or diminishing attachment with a liquid material may be performed to facilitate the process of separating the at least one 530 of the solidified polymer, organic material, or dielectric material.

Additionally, a system manufacturing a triboelectric energy harvester may generate an electrification material 540 with a micro-nano patterned surface, on which a coating electrification layer can be uniformly formed, by performing surface treatment with plasma or liquid chemical material for uniformity of the coating electrification layer on the micro-nano patterned surface. This surface treatment may be omitted in the case of a micro-nano patterned surface on which a coating electrification layer can be uniformly formed even without the surface treatment.

Figure 6:
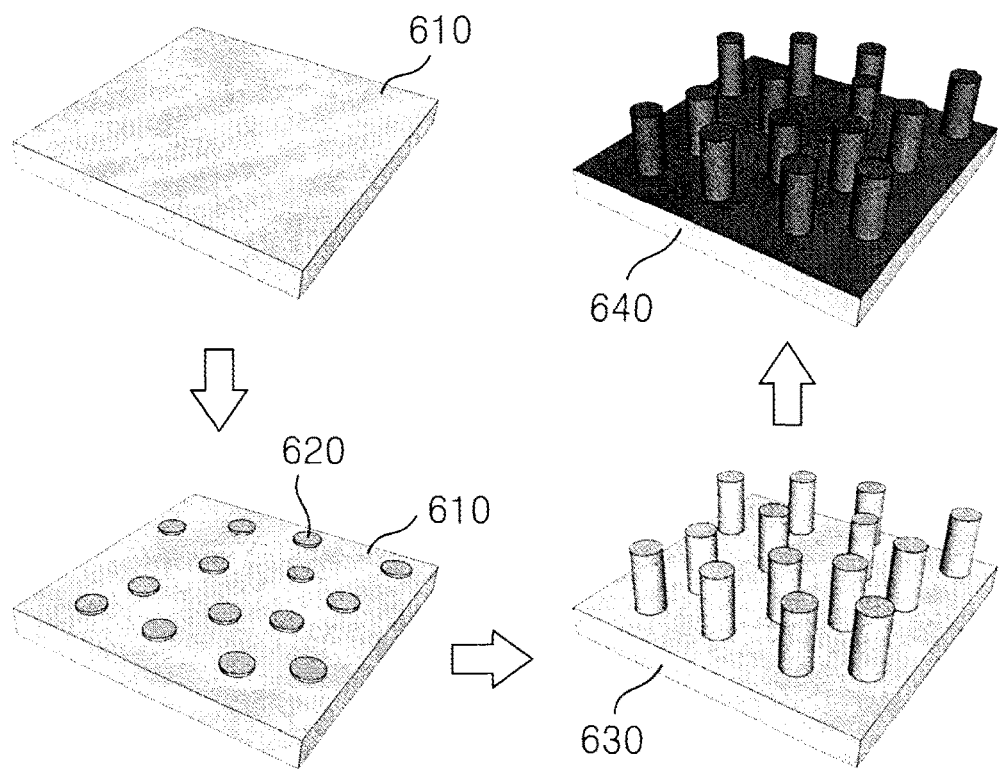
FIG. 6 is a diagram illustrating a process of generating a micro-nano pattern according to another embodiment of the present disclosure.

FIG. 6 is a diagram illustrating a process of generating a micro-nano pattern according to another embodiment of the present disclosure.

Referring to FIG. 6, a system manufacturing a triboelectric energy harvester according to an embodiment of the present disclosure may generate an electrification material with a micro-nano patterned surface by using a bottom-up process.

In detail, a system manufacturing a triboelectric energy harvester may form an electrification material 630 with a micro-nano patterned surface by forming a seed material 620 on an electrification material 610 (e.g., an electrode may be used instead of an electrification material from which the seed material having a micro-nano patterned surface is generated), and then growing the seed material 620.

During this, for a growing process, the seed material 620 may be used with at least one of polymer, organic material, or dielectric material which is superior in property of growth. Additionally, a system manufacturing a triboelectric energy harvester may form the seed material 620 by using a deposition process such as sputtering after setting a structural density of a micro-nano pattern.

Here, a system manufacturing a triboelectric energy harvester may adjust a growth time of the seed material 620 based on a size and a length of a micro-nano pattern which maximizes a surface area of a contact interface.

Additionally, a system manufacturing a triboelectric energy harvester may generate an electrification material 640 with a micro-nano patterned surface, on which a coating electrification layer can be uniformly formed, by performing surface treatment with plasma or liquid chemical material for uniformity of the coating electrification layer on the micro-nano patterned surface. This surface treatment may be omitted in the case of a micro-nano patterned surface on which a coating electrification layer can be uniformly formed even without the surface treatment.

Figure 7:
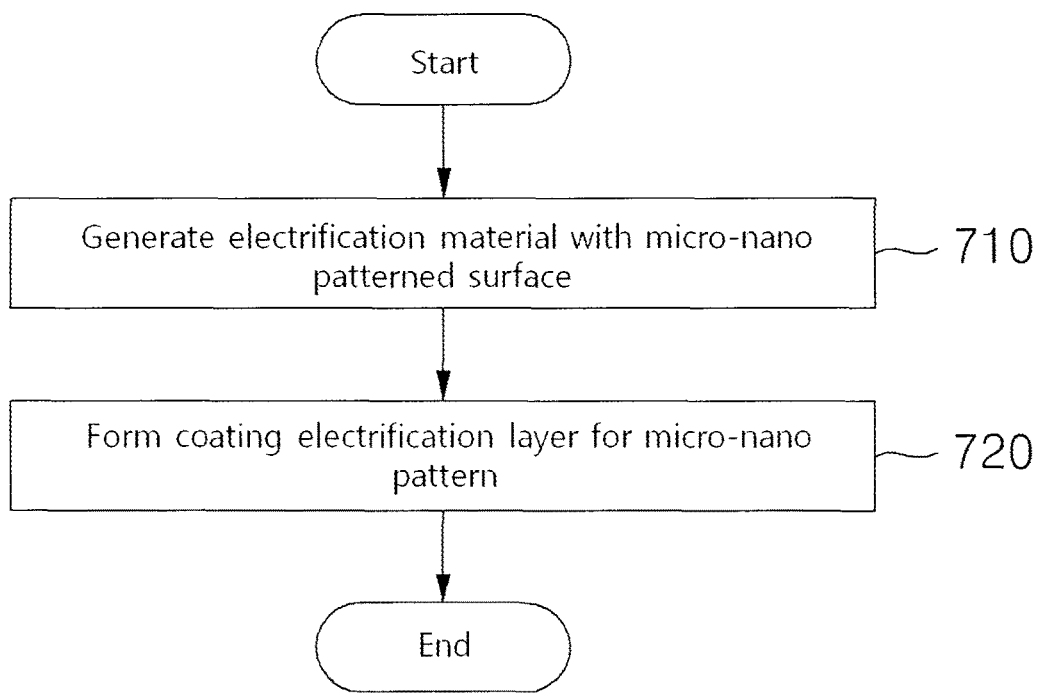
FIG. 7 is a flow chart showing a manufacturing method of a triboelectric energy harvester according to an embodiment of the present disclosure.

FIG. 7 is a flow chart showing a manufacturing method of a triboelectric energy harvester according to an embodiment of the present disclosure.

Referring to FIG. 7, a system manufacturing a triboelectric energy harvester may generate an electrification material having a micro-nano patterned surface on an electrode (step 710).

During this, a system manufacturing a triboelectric energy harvester may generate an electrification material having a micro-nano patterned surface on the electrode by using at least one of a soft lithography or bottom-up process.

After then, a system manufacturing a triboelectric energy harvester may form a coating electrification layer to support a micro-nano pattern on the surface of the electrification material (step 720). For example, a system manufacturing a triboelectric energy harvester may form a coating electrification layer with at least one of polymer, organic material, or dielectric material which is superior in step coverage to support a micro-nano pattern.

During this, a system manufacturing a triboelectric energy harvester may form the coating electrification layer on the surface of the electrification material by using at least one of ICVD or SAM. For example, a system manufacturing a triboelectric energy harvester may deposit a coating electrification layer on the surface of an electrification material in atomic level.

Here, a system manufacturing a triboelectric energy harvester may form the coating electrification layer with a material which is higher than the electrification material in triboelectric charge density. For example, a system manufacturing a triboelectric energy harvester may form a coating electrification layer with at least one of polymer, organic material, or dielectric material which is higher in triboelectric charge density than at least one of polymer, organic material, or dielectric material forming an electrification material.

Additionally, a system manufacturing a triboelectric energy harvester may form a coating electrification layer with a plurality of layers. For example, a system manufacturing a triboelectric energy harvester may form the plurality of layers by different materials or different properties, respectively.

While embodiments of the present disclosure have been shown and described with reference to the accompanying drawings thereof, it will be understood by those skilled in the art that various changes and modifications in form and details may be made therein without departing from the spirit and scope of the present disclosure as defined by the appended claims and their equivalents. For example, it may be allowable to achieve desired results although the embodiments of the present disclosure are preformed in other sequences different from the descriptions, and/or the elements, such as system, structure, device, circuit, and so on, are combined or assembled in other ways different from the descriptions, replaced or substituted with other elements or their equivalents.

Therefore, other implementations, other embodiments, and equivalents of the appended claims may be included in the scope of the appended claims.

What is claimed is:

1. A manufacturing method of a triboelectric energy harvester, the method comprising:
   generating an electrification material with a surface of a micro-nano pattern on an electrode; and
   forming a coating electrification layer to support the micro-nano pattern on a surface of the electrification material.

2. The manufacturing method of claim 1, wherein the forming of the coating electrification layer comprises:
   forming the coating electrification layer on the surface of the electrification material by using at least one of ICVD or SAM.

3. The manufacturing method of claim 1, wherein the forming of the coating electrification layer comprises:
   forming the coating electrification layer with a material that is higher than the electrification material in triboelectric charge density.

4. The manufacturing method of claim 3, wherein the forming of the coating electrification layer comprises:
   forming the coating electrification layer with at least one of polymer, organic material, or dielectric material superior in step coverage to support the micro-nano pattern.

5. The manufacturing method of claim 1, wherein the forming of the coating electrification layer comprises:
   forming the coating electrification layer to have a plurality of layers on the surface of the electrification material.

6. A triboelectric energy harvester having a coating electrification layer, comprising:
   an electrode;
   an electrification material generated on the electrode and configured to have a surface of a micro-nano pattern; and
   a coating electrification layer formed on the surface of the electrification material.

7. The triboelectric energy harvester of claim 6, wherein the coating electrification layer is formed on the surface of the electrification material by using at least one of ICVD or SAM.

8. The triboelectric energy harvester of claim 6, wherein the coating electrification layer is formed with a material that is higher than the electrification material in triboelectric charge density.

9. The triboelectric energy harvester of claim 8, wherein the coating electrification layer is formed with at least one of polymer, organic material, or dielectric material superior in step coverage to support the micro-nano pattern.

10. The triboelectric energy harvester of claim 6, wherein the coating electrification layer is formed to have a plurality of layers on the surface of the electrification material.

* * * * *